US012618532B2

(12) United States Patent
Heo et al.

(10) Patent No.: US 12,618,532 B2
(45) Date of Patent: May 5, 2026

(54) PROTECTIVE COVER FOR SHOULDER PART OF PRESSURE VESSEL

(71) Applicant: DUKSAN AETHERCT CO., LTD., Busan (KR)

(72) Inventors: Seok-Bong Heo, Busan (KR); Sang-Jin Jeon, Busan (KR); Jae-Sung Park, Busan (KR); Kyoung-Hun Kim, Busan (KR); Chang-Uk Lee, Busan (KR); Jihee Jung, Busan (KR); Ae-Rin Heo, Busan (KR); Ho-Sun Wee, Busan (KR)

(73) Assignee: DUKSAN AETHERCT CO., LTD., Busan (KR)

( * ) Notice: Subject to any disclaimer, the term of this patent is extended or adjusted under 35 U.S.C. 154(b) by 0 days.

(21) Appl. No.: 18/633,713

(22) Filed: Apr. 12, 2024

(65) Prior Publication Data

US 2025/0137599 A1 May 1, 2025

(30) Foreign Application Priority Data

Nov. 1, 2023 (KR) ........................ 10-2023-0149304
Nov. 1, 2023 (KR) ........................ 10-2023-0149305
Nov. 1, 2023 (KR) ........................ 10-2023-0149306

(51) Int. Cl.
*F17C 13/12* (2006.01)

(52) U.S. Cl.
CPC ...... *F17C 13/12* (2013.01); *F17C 2205/0308* (2013.01)

(58) Field of Classification Search
CPC .............. F17C 2205/0308; F17C 13/12; F17C 2201/0109; F17C 2201/056; F17C 2201/058; F17C 2203/0604; F17C 2203/0607; F17C 2221/012; F17C 2223/0123; F17C 2223/036; F17C 2260/011; F17C 2270/0168; F17C 2270/0184; F17C 1/02; F17C 1/00; F17C 1/04; F17C 1/12; F17C 2203/0619; F17C 2203/0621; F17C 2203/0624
USPC .... 220/694, 581, 23.91, 729, 732, 626, 646, 220/586, 592; 285/192, 235, 236; 24/339
See application file for complete search history.

(56) References Cited

U.S. PATENT DOCUMENTS 5,476,189 A 12/1995 Duvall et al.
10,627,049 B2 4/2020 Schimenti et al.
2004/0026437 A1* 2/2004 Hembert ............... F17C 13/123 220/630
2007/0068957 A1* 3/2007 Oliveira .................... F17C 1/06 220/586
2019/0203883 A1* 7/2019 Kojima ..................... F17C 1/02
2020/0132252 A1* 4/2020 Silva Vieira .............. F17C 1/16
2023/0304633 A1 9/2023 Yoo et al.
(Continued)

FOREIGN PATENT DOCUMENTS

EP 3667152 A1 * 6/2020 ................ F17C 1/06
EP 3667152 B1 10/2023
KR 10-1856323 B1 5/2018
(Continued)

*Primary Examiner* — Laura E. Parker
(74) *Attorney, Agent, or Firm* — NKL Law; Jae Youn Kim

(57) ABSTRACT

The present invention relates to a protective cover for a shoulder part of a pressure vessel, and more particularly, to a protective cover coupled to a shoulder part of a pressure vessel to protect the shoulder part from friction or impact.

4 Claims, 14 Drawing Sheets

(56) References Cited

U.S. PATENT DOCUMENTS

2024/0310001 A1* 9/2024 Coors ....................... F17C 1/02

FOREIGN PATENT DOCUMENTS

KR 10-2250341 B1 5/2021
KR 10-2023-0095149 A 6/2023

* cited by examiner (a)

(b)

(a)

(b)

PROTECTIVE COVER FOR SHOULDER PART OF PRESSURE VESSEL

BACKGROUND OF THE INVENTION

Field of the Invention

The present invention relates to a protective cover for a shoulder part of a pressure vessel, and more particularly, to a protective cover coupled to a shoulder part of a pressure vessel to protect the shoulder part from friction or impact.

Background Art

A pressure vessel is used to store various fluids such as oxygen, natural gas, and nitrogen, and recently, is also used as a vessel for storing hydrogen which is the fuel for an eco-friendly hydrogen fuel cell vehicle.

A conventional plastic liner formed of a plastic material has a cylindrical shape with a hollow interior, and includes a dome-shaped shoulder part of which one or both sides have a curved cross-section.

The shoulder part is vulnerable to internal pressure of the vessel or external impact.

PATENT LITERATURE

Patent Documents

Patent Document 1: Korean Patent No. 10-2250341
Patent Document 2: Korean Patent No. 10-1856323

SUMMARY OF THE INVENTION

Accordingly, the present invention has been made to solve the above-mentioned problems occurring in the prior arts, and it is an object of the present invention to provide a cover for reinforcing a shoulder part of a pressure vessel.

To accomplish the above object, according to the present invention, there is provided a protective cover for a shoulder part of a pressure vessel, which is coupled to a dome-shaped shoulder part on one or both sides of the pressure vessel to protect the shoulder part, including: an impact resistance member made of impact-absorbing foam; an outer shell coupled to the impact resistance member while wrapping around the impact resistance member; and a detachable means for detachably coupling the impact resistance member and the outer shell to each other.

Moreover, the detachable means includes: a fixing part provided on either the impact resistance member or the outer shell; and an insertion part provided on the other of the impact resistance member or the outer shell.

In addition, the detachable means includes: a holding part, which has a fixing groove formed at a position spaced apart from the edge of the outer shell toward the center, and a push bar rotatably mounted on the outer shell to elastically press the outer surface of the impact resistance member or return the impact resistance member to the original position; and a fitting part, which protrudes outward from the outer surface of the impact resistance member and includes a coupling protrusion seated on the fixing groove.

The cover for reinforcing the shoulder part of the pressure vessel according to the present invention can reinforce the shoulder part of the pressure vessel, thereby preventing damage to the shoulder part from external impact.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
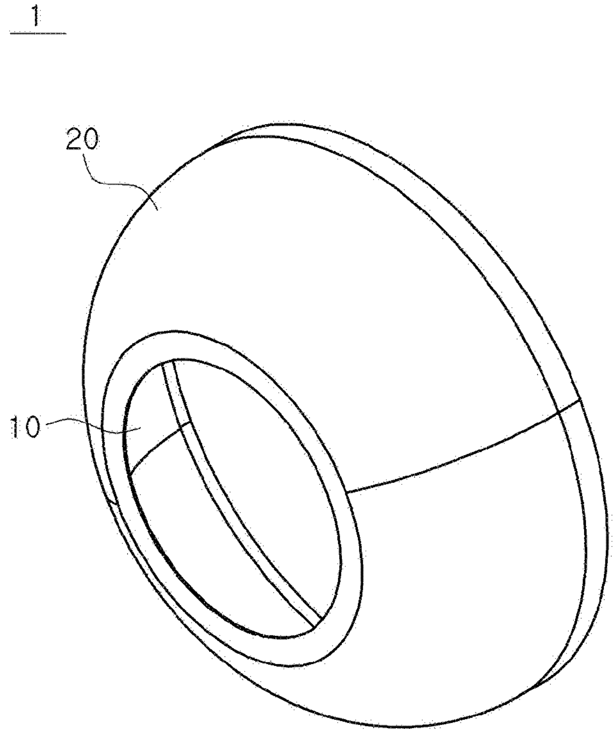
FIGS. 1 to 5 illustrate a protective cover for the shoulder part of a pressure vessel according to a first embodiment of the present invention.
Figure 2:
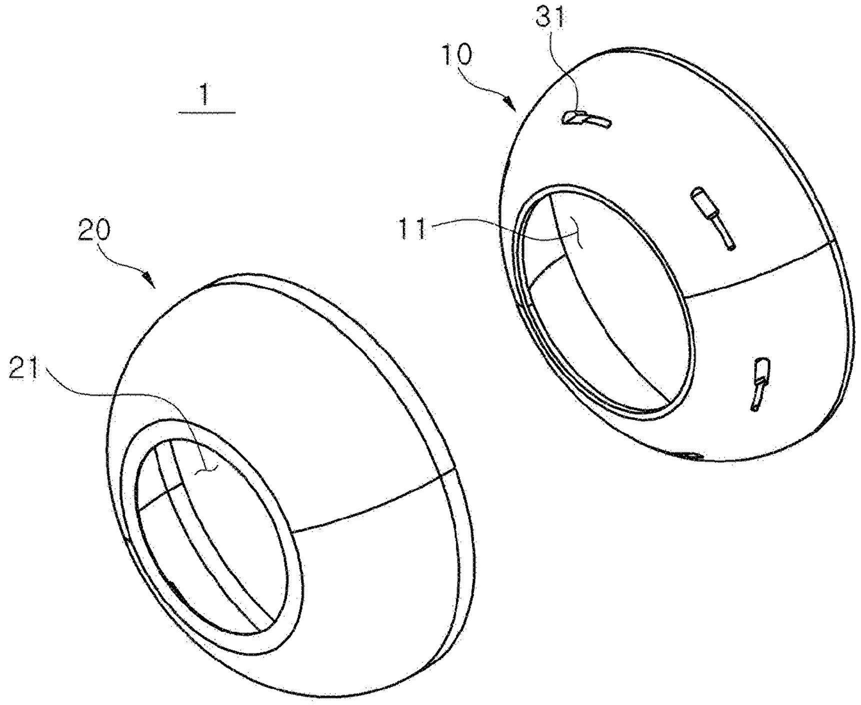
Figure 3:
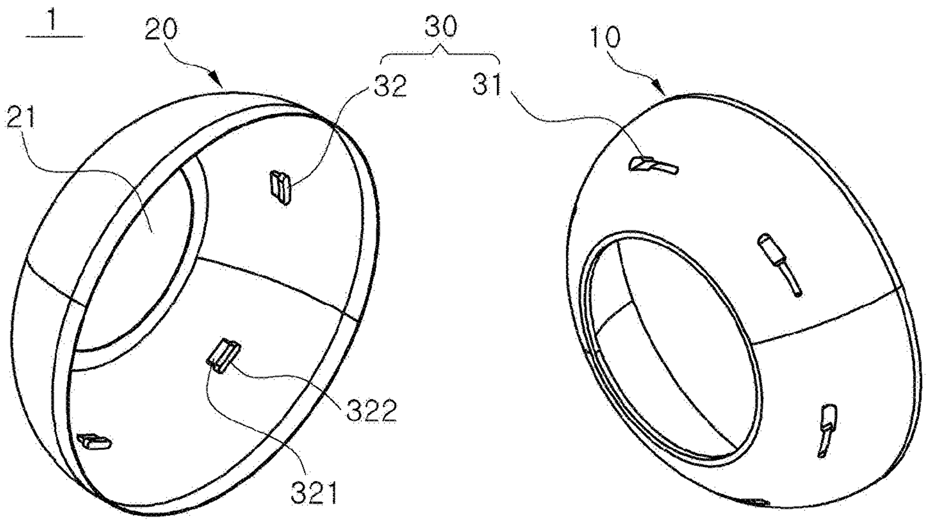
Figure 4:
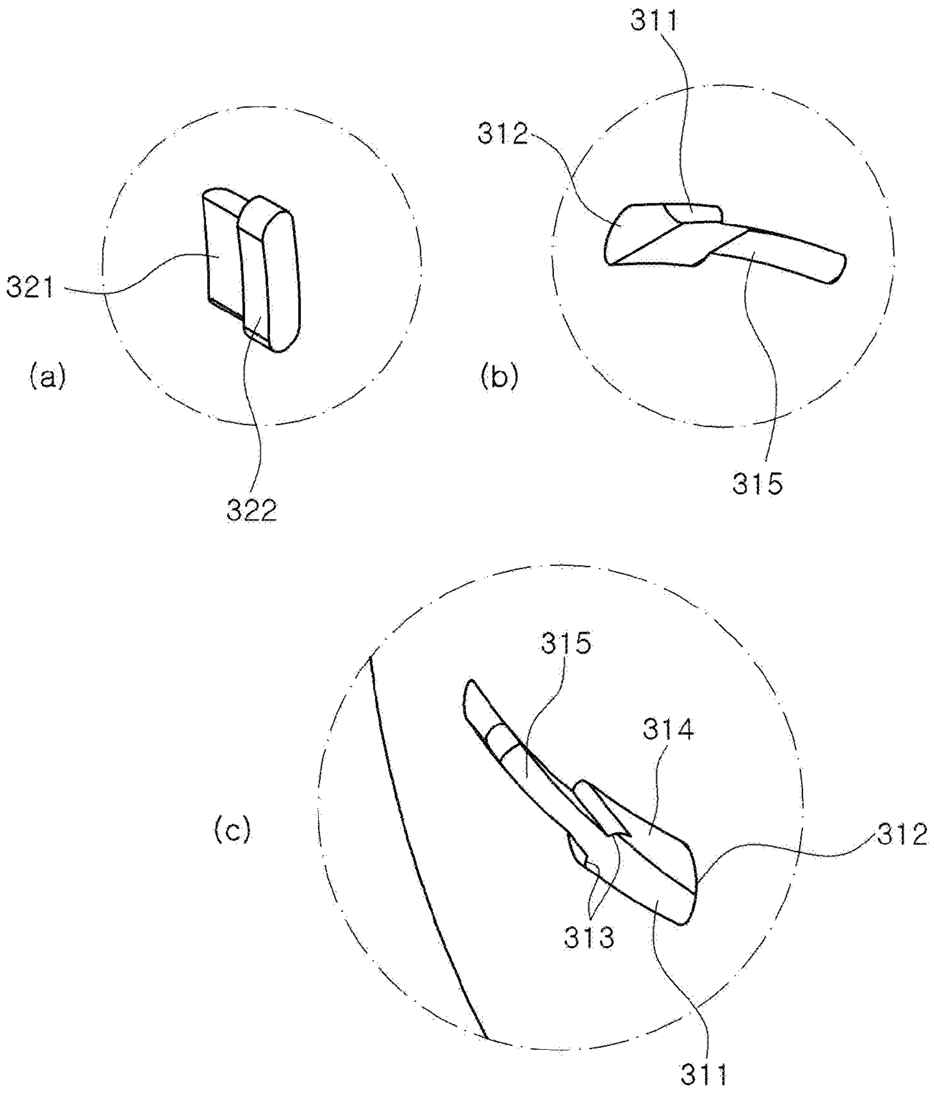

Hereinafter, preferred embodiments of a protective cover for a shoulder part of a pressure vessel according to the present invention will be described in detail with reference to the accompanying drawings.

First, as illustrated in FIGS. 1 to 5, the protective cover 1 for the shoulder part of the pressure vessel according to the first embodiment of the present invention, which is coupled to a dome-shaped shoulder part on one or both sides of the pressure vessel to protect the shoulder part, includes: an impact resistance member 10 made of impact-absorbing foam; an outer shell 20 coupled to the impact resistance member 10 while wrapping around the impact resistance member 10; and a detachable means 30 for detachably coupling the impact resistance member 10 and the outer shell 20 to each other.

The protective cover 1 according to the first embodiment is coupled to the shoulder part of a plastic liner made of synthetic resin material, and in this instance, is configured to be separably coupled to a fixing flange 40 described later, thereby allowing only the protective cover to be replaced in case of wear or damage. The detailed structure will be described later.

The impact resistance member 10 compensates for vibration and impact transmitted from the outside to protect the shoulder part, and can be manufactured, for example, by foaming and molding a non-combustible rigid urethane material in a mold.

The impact resistance member 10 is arranged to cover a portion of the shoulder part to protect the shoulder part vulnerable to external impact and pressure, and is formed in a dome shape similar to the shoulder part overall.

Additionally, the impact resistance member 10 is provided with a through hole 11 at the center to provide a passage through which a nozzle of the pressure vessel is exposed to the outside.

Furthermore, the impact resistance member 10 can be attached to the surface of the shoulder part by an adhesive to be fixed. It is possible to use a separate adhesive, or to use a resin impregnated when carbon fiber or glass fiber is wound on the liner.

Of course, the impact resistance member 10 may be detachably coupled to the outer shell 20 described later, and then, the outer shell 20 is detachably coupled to the fixing flange 40 to cover one side of the impact resistance member.

The outer shell 20 is formed to protect the shoulder part and the impact resistance member 10, and is formed overall in a dome shape similar to the shoulder part. The outer shell 200 has a through hole 21 formed at the center to prevent interference with the nozzle, and it is desirable that the inner surface of the through hole 21 is in close contact with the nozzle.

The outer shell 20 is arranged to wrap around the shoulder part in the state in which the impact resistance member 10 is coupled to the outer shell 20, and partially offsets external impact or vibration before the external impact or vibration is transmitted to the impact resistance member 10, and prevents foreign substances placed externally or transferred from the outside, thereby preventing damage to the impact resistance member 10.

Meanwhile, the outer shell 20 can be coupled to the impact resistance member 10 fixed to the shoulder part or can be coupled to the shoulder part after the impact resistance member 10 is first coupled. In this instance, the outer shell 20 can be detachably coupled to the fixing flange 40 via fixing bolts, nuts, and washers, thereby enabling replacement of the outer shell 20 and the impact resistance member 10 in case of breakage or damage during use.

Here, the present invention can minimize the time required for replacement of the outer shell 20 and the impact resistance member 10, and as described above, the outer shell 20 and the impact resistance member 10 can be coupled and detached through the fixing bolts, nuts, and washers, thereby enhancing the convenience of coupling.

Additionally, since there is no need for disassembly and reassembly of the liner, the shoulder part, or the nozzle during the process of replacing the outer shell 20 and the impact resistance member 10, the assembled portion between the liner and shoulder part and the coupled portion of the nozzle can maintain sealability, thereby ensuring stability.

The detachable means 30 is configured to detachably couple the impact resistance member 10 and the outer shell 20 from each other, so that in case of damage to the impact resistance member 10 or the outer shell 20 during use, the impact resistance member 10 or the outer shell 20 can be easily replaced, thereby enhancing the convenience of replacement.

The detachable means 30 is configured to detachably couple the impact resistance member 10 and the outer shell 20 from each other, so various means can be applied as the detachable means 30 if they can detachably couple the impact resistance member 10 and the outer shell 20. However, if means penetrating the target, such as bolts and nuts, are used, there is a problem of reducing the durability of the impact resistance member 10 and the outer shell 20, and if adhesive or similar means is used, there is a problem of increased time for post-processing due to unclean separation portions, or the inability to use them.

Therefore, in the present invention, it is desirable that the detachable means 30 can enhance the convenience of coupling and detaching, and does not require post-processing such as cleaning when the contacting portions are separated.

For this purpose, the detachable means 30 in the present invention includes: a fixing part 31 provided on the impact resistance member 10 or the outer shell 20; and an insertion part 32 provided on the other of the impact resistance member 10 or the outer shell 20.

Here, the fixing part 31 and the insertion part 32 are each provided on either the impact resistance member 10 or the outer shell 20, and are formed on different members from each other.

That is, when the fixing part 31 is formed on the impact resistance member 10, the insertion part 32 is formed on the outer shell 20, and conversely, when the insertion part 32 is formed on the impact resistance member 10, the fixing part 31 is formed on the outer shell 20.

Hereinafter, although it is described that the fixing part 31 is formed on the impact resistance member 10 and the insertion part 32 is formed on the outer shell 20 in this embodiment, it is an embodiment, and as mentioned, the fixing part 31 and the insertion part 32 may be formed on different members.

The fixing part 31 is provided on any one of the outer circumferential surface of the impact resistance member 10 or the inner circumferential surface of the outer shell 20, and includes: a coupling groove 311 formed to extend on the surface in the circumferential direction and formed to be recessed inward; an entrance 312 formed on one side of the coupling groove 311 to allow the insertion part 32 to go in and out; and a retaining jaw 313 formed to extend along the coupling groove 311 to close a portion of the top of the coupling groove 311.

The coupling groove 311 is formed to extend in the circumferential direction from the surface of either the outer circumferential surface of the impact resistance member 10 or the inner circumferential surface of the outer shell 20, formed to be recessed inward from the surface so that the inserted insertion part 32 is placed.

Hereinafter, an embodiment that the fixing part 31 is formed on the outer circumferential surface of the impact resistance member 10 will be described.

Here, the fact that the coupling groove 311 is formed in the circumferential direction of the impact resistance member 10 is to enable the outer shell 20 and the impact resistance member 10 to be coupled or detached by rotating the outer shell 20 to the right or the left in the circumferential direction when coupling or detaching them.

The entrance 312 is provided on one side end of the coupling groove 311 to allow the insertion part 32 to go in and out the coupling groove 311, and has a width equal to the width of the coupling groove 311.

Here, the entrance 312 includes a main entrance 314 through which a fixing protrusion 322 of the insertion part 32 goes in and out and a path groove 315 through which a support 321 of the insertion part 32 moves.

At this time, the path groove 315 is formed by the retaining jaw 313. After the fixing protrusion 322 is inserted through the main entrance 314, the support 321 moves along the path groove 315, and the fixing protrusion 322 is retained by the retaining jaw 313, thereby preventing separation.

The retaining jaw 313 is formed in the circumferential direction from one side end of the entrance 312, i.e., along the coupling groove 311, to close a portion of the opened top of the coupling groove 311, and a pair of the retaining jaws 313 face each other to provide the the path groove 315. In this instance, the end portions of the retaining jaws 313 are formed to be spaced apart from each other.

The insertion part 32 is provided on any one of the outer circumferential surface of the impact resistance member 10 and the inner circumferential surface of the outer shell 20, and includes: a support 321 protruding outward from the surface; and a fixing protrusion 322 formed on the front end portion of the support 321 to have an area wider than that of the support 321 and inserted and fixed to the fixing part 31.

Hereinafter, an embodiment that the insertion part 32 is formed on the inner surface of the outer shell 20 will be described.

The support 321 protrudes outward from the inner surface of the outer shell 20, namely, toward the impact resistance member 10 touching the inner circumferential surface of the outer shell 20.

Here, the length and width of the support 321 are configured to have a length corresponding to the width of the path groove 315 and the depth of the coupling groove 311 to move along the path groove 315 formed by the retaining jaw 313.

The fixing protrusion 322 is formed at the front end portion of the support 321 to go in and out the entrance 312 of the fixing part 31, and is restricted from separation by the retaining jaw 313 when seated in the coupling groove 311.

The detachable means 30 allows the impact resistance member 10 and the outer shell 20 to be coupled by the fixing protrusion 322, which is inserted into the entrance 312 and then is restricted in movement by the retaining jaw 313 after the support 321 is coupled while moving along the path groove 315.

The detachable means 30 may be formed in plurality at positions mutually spaced based on the center points of the impact resistance member 10 and the outer shell 20, thereby providing a strong coupling force.

Furthermore, to separate the impact resistance member 10 and the outer shell 20 from each other through the detachable means 30, the impact resistance member 10 and the outer shell 20 are rotated in the opposite direction to the coupling direction, and then, the fixing protrusion 322 is moved toward the entrance 312, thereby reducing the coupling time and the separation time of the impact resistance member 10 and the outer shell 20 and enhancing convenience.

Meanwhile, after the impact resistance member 10 and the outer shell 20 are coupled together and are detachably coupled to the shoulder part to use, during the process of replacing the damaged or worn impact resistance member and outer shell, a fixing flange 40 is provided to maintain the sealability of the coupled portions of the liner, the shoulder part, and the nozzle of the pressure vessel.

The fixing flange 40 is formed in a ring shape with an empty center to be fit on the outer surface of the shoulder part, is arranged such that an end of the fixing flange 40 is in contact with the outer surface of the shoulder part, and then, is fixed integrally by welding or bonding.

A plurality of fastening holes 41 are formed at a plurality of positions mutually spaced on the fixing flange 40 and the outer shell 20, wherein fastening bolts 50 engage with the fastening holes 41 to fix the outer shell 20 to the fixing flange 40.

Here, it is desirable for the fastening holes 41 formed on the outer shell 20 to be formed at positions where the insertion positions of the fastening bolts 50 do not damage the coupled impact resistance member 10.

Figure 5:
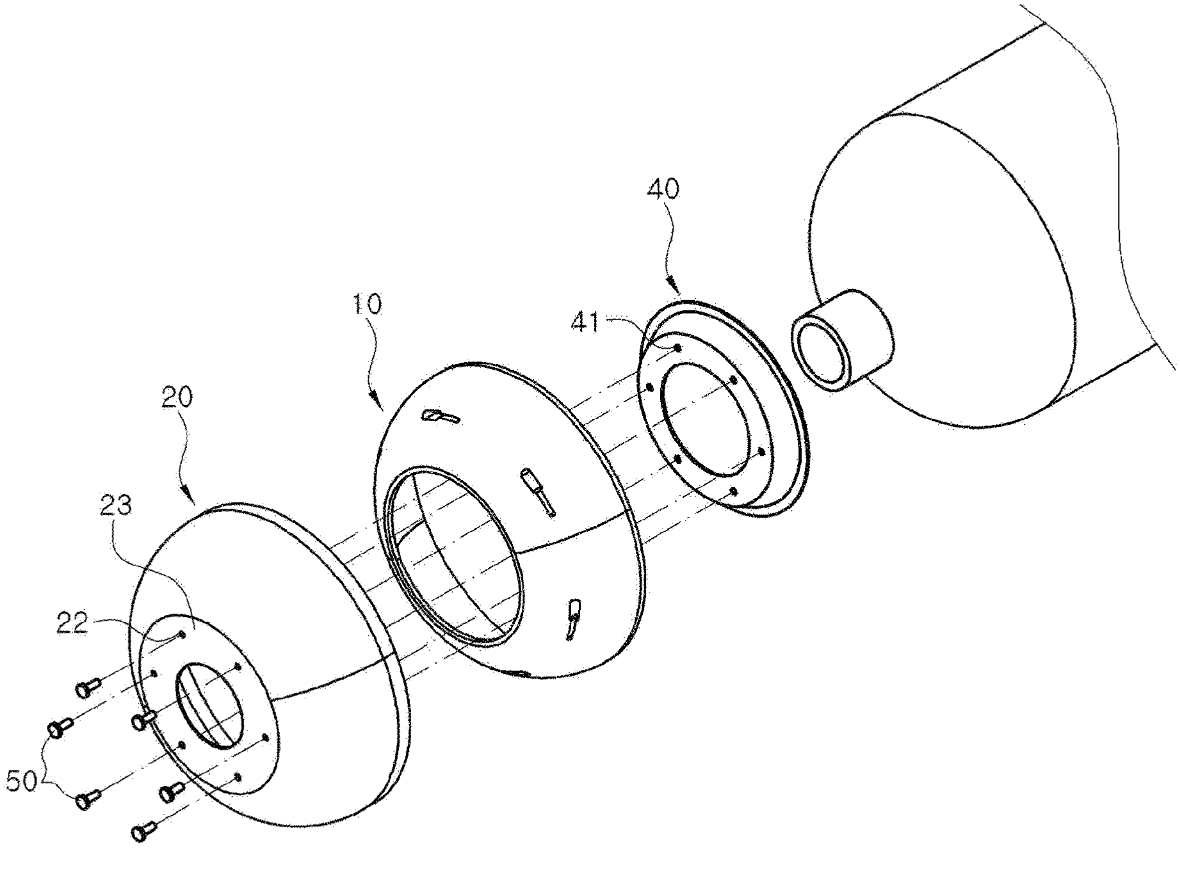
Figure 6:
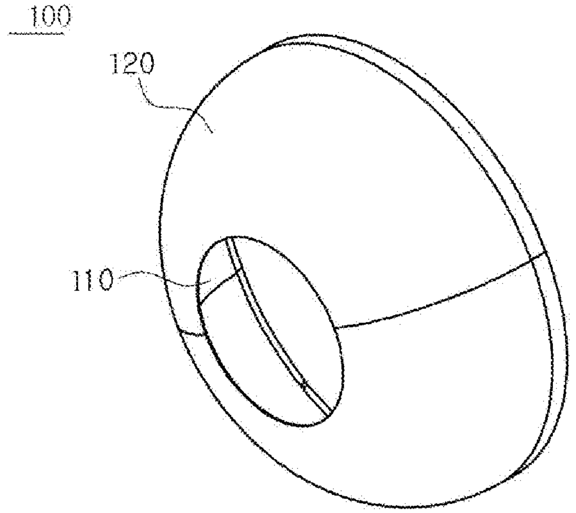
FIGS. 6 to 10 illustrate a protective cover for the shoulder part of a pressure vessel according to a second embodiment of the present invention.
Figure 7:
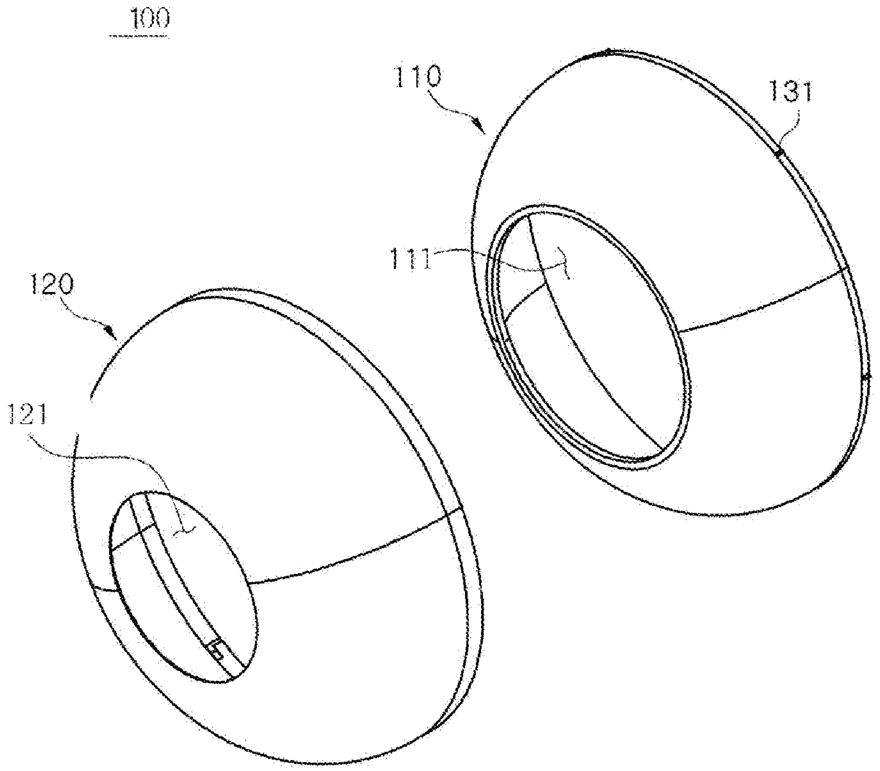
Figure 8:
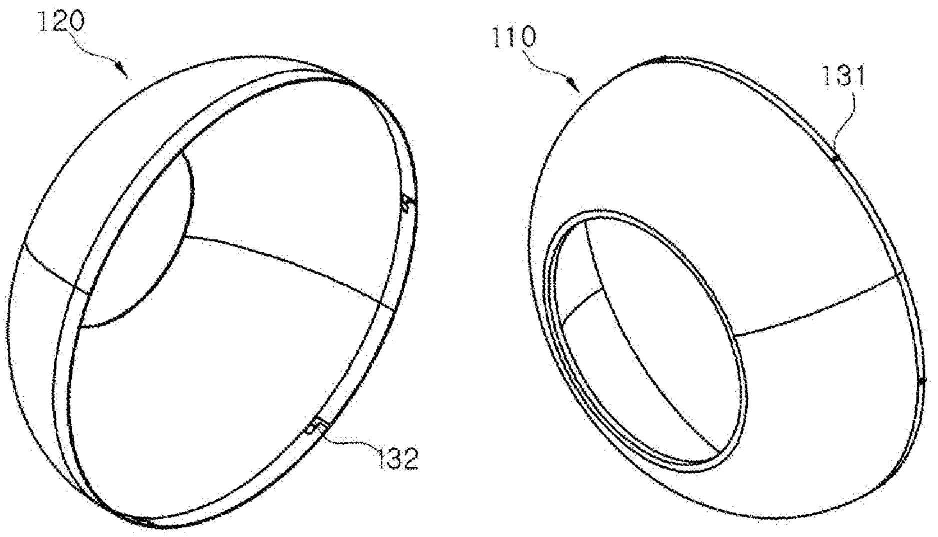
Figure 9:
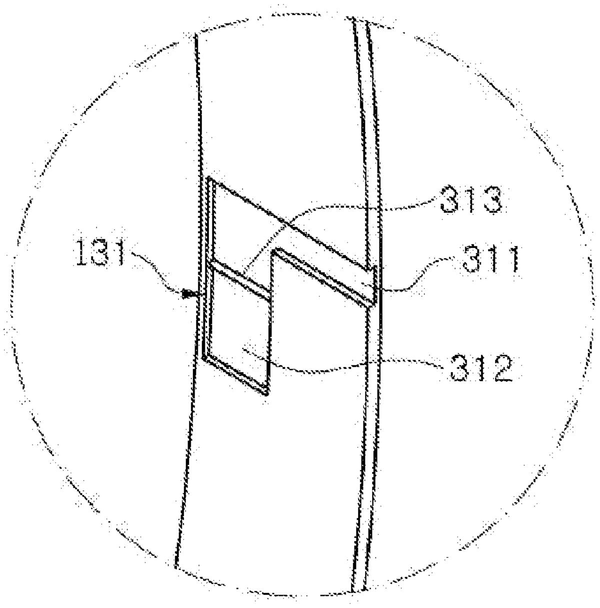
Figure 9:
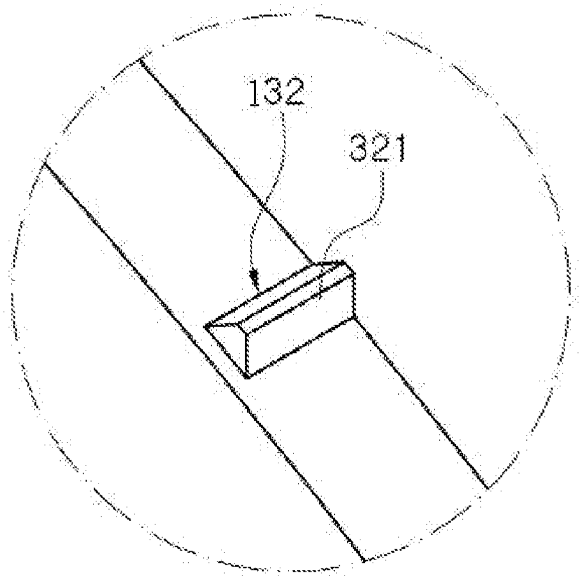
Figure 10:
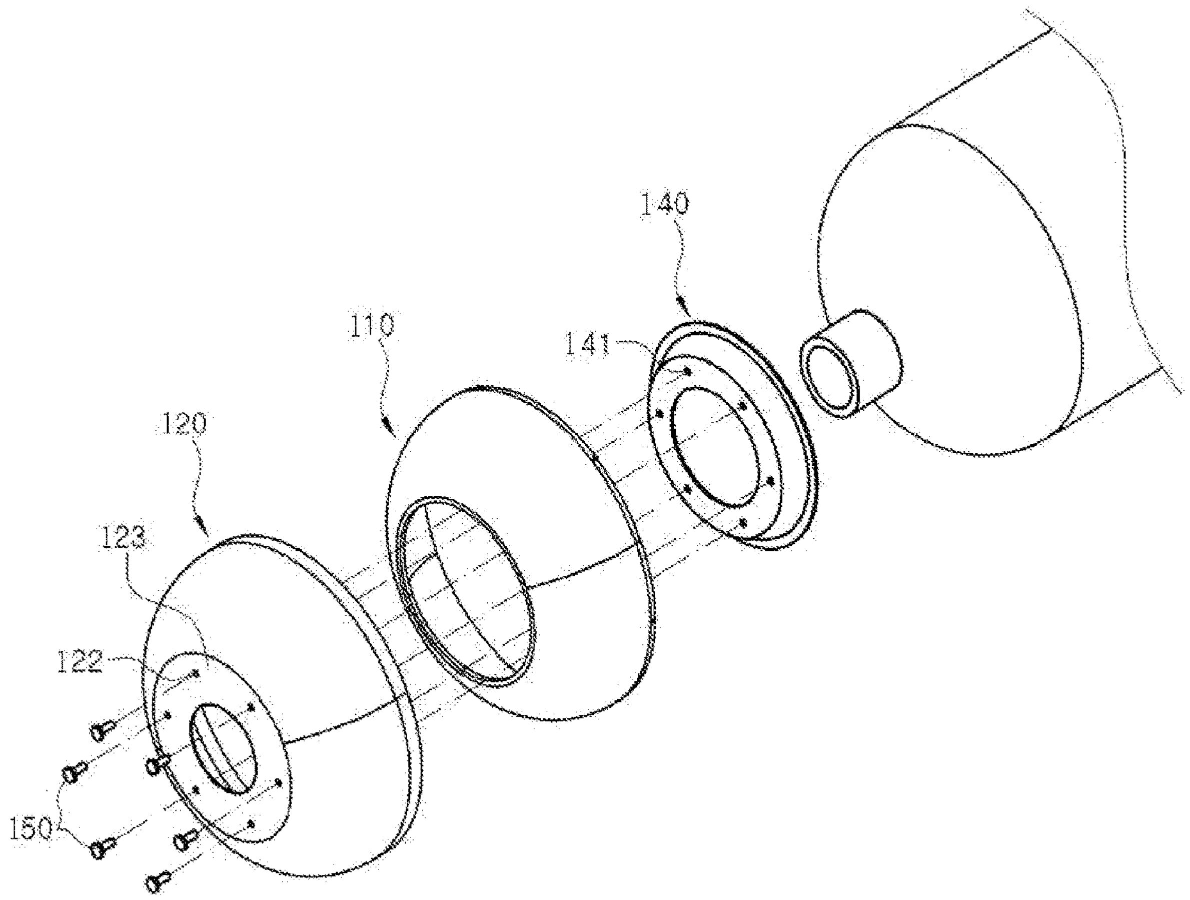
Figure 11:
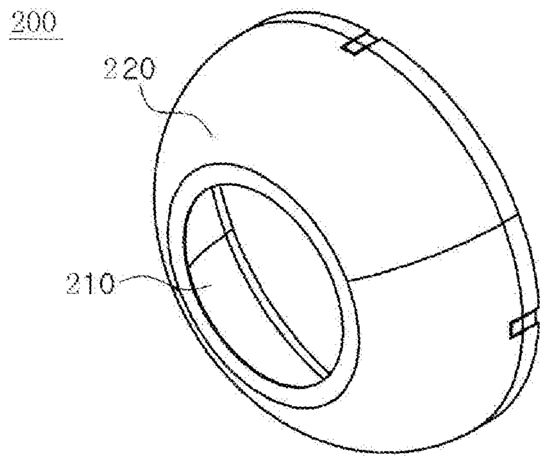
FIGS. 11 to 15 illustrate a protective cover for the shoulder part of a pressure vessel according to a third embodiment of the present invention.
Figure 12:
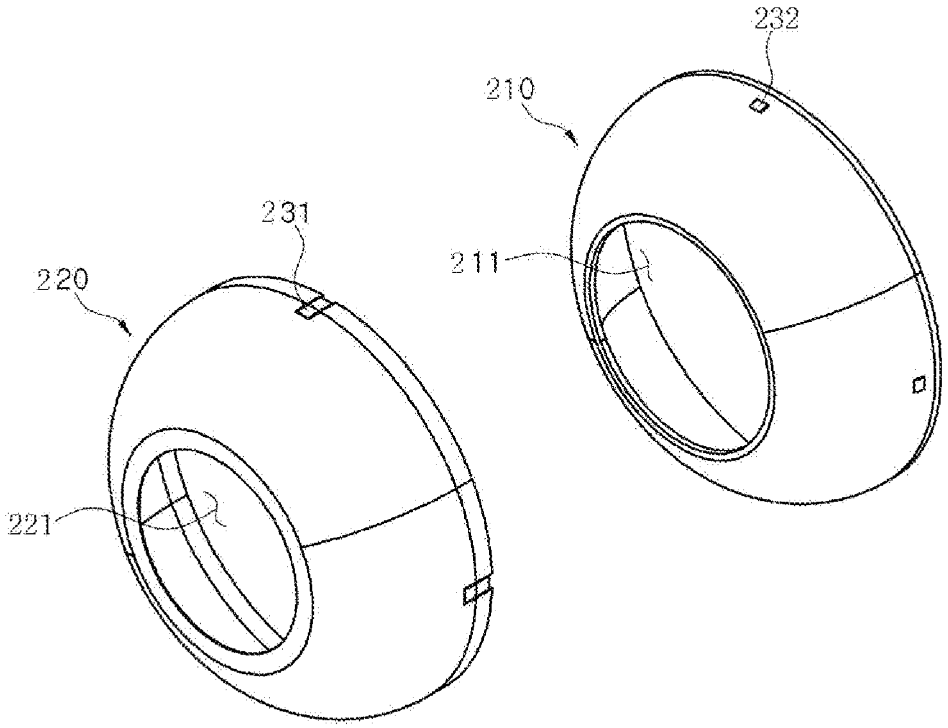
Figure 13:
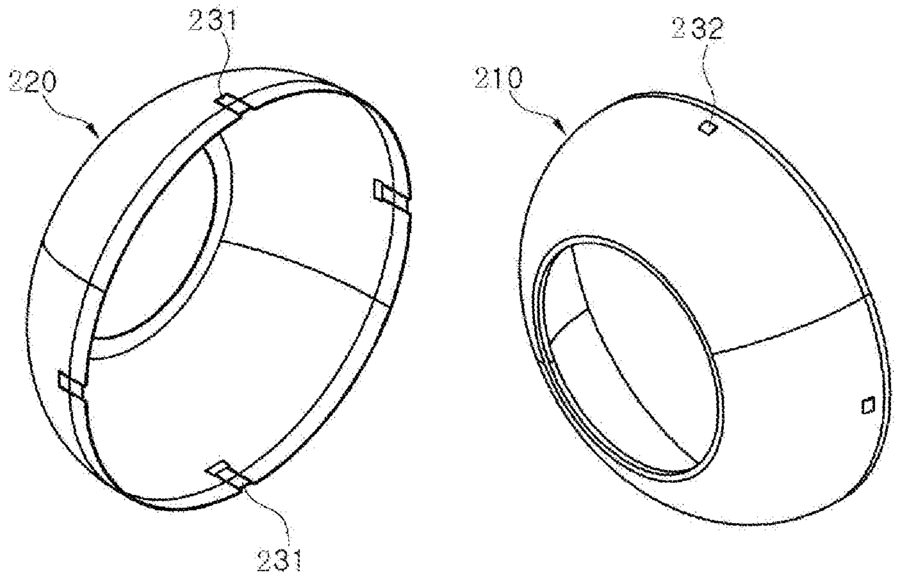
Figure 14:
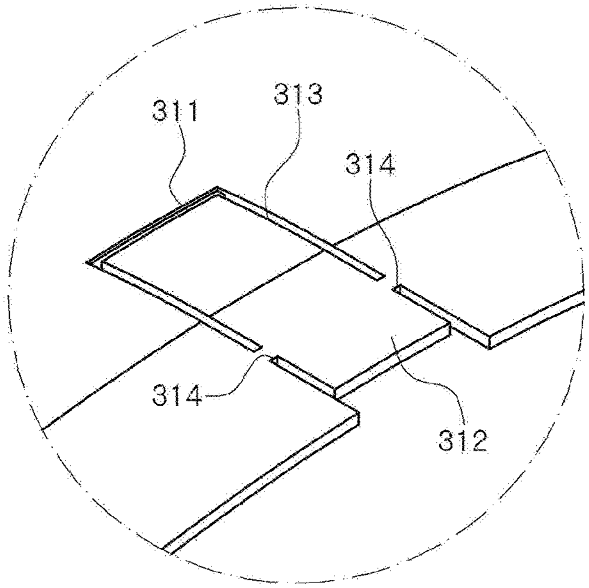
Figure 14:
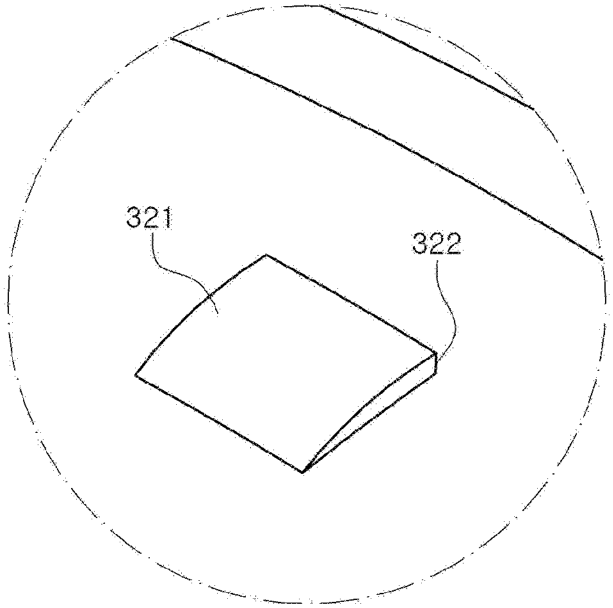
Figure 15:
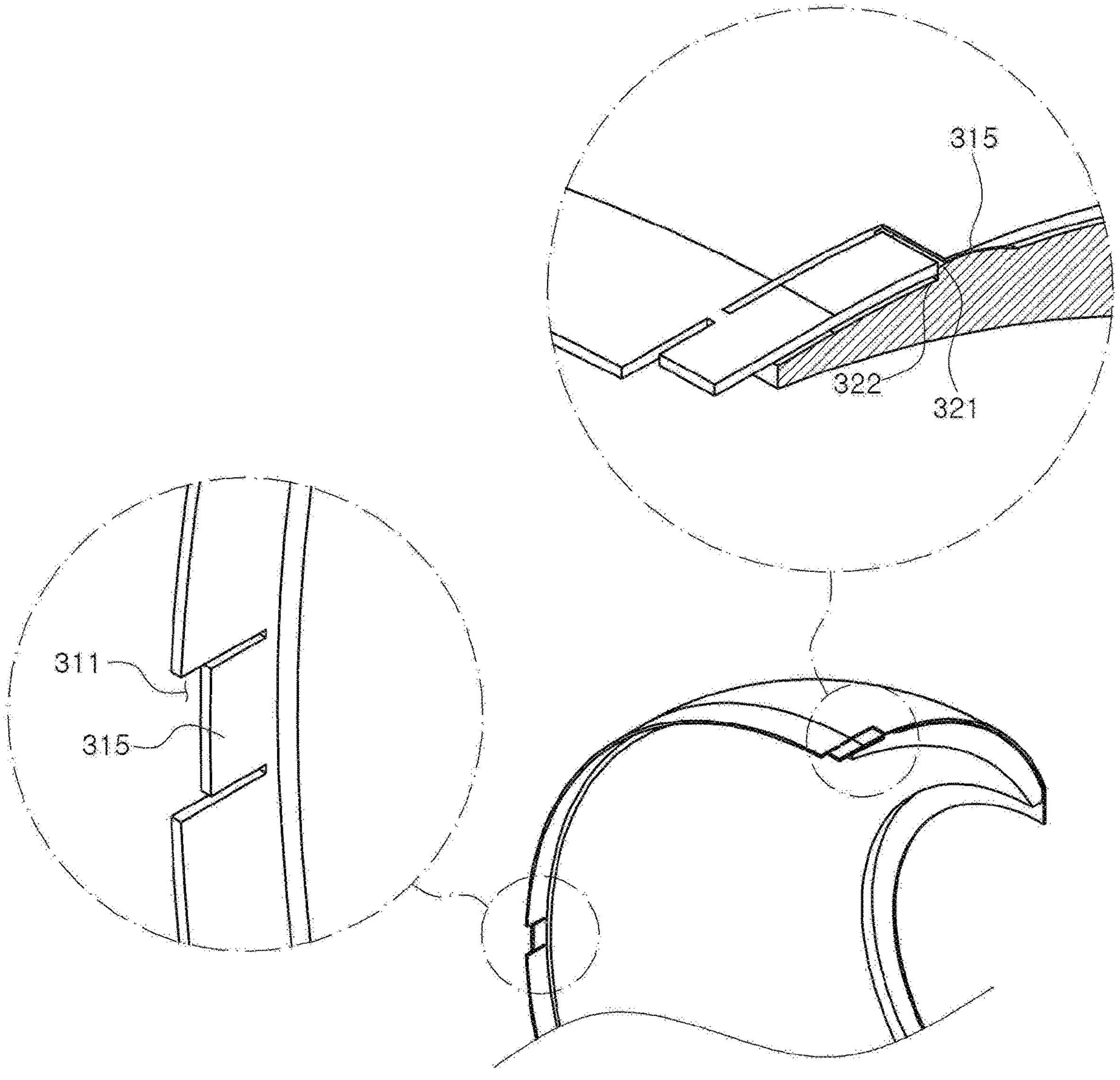

As illustrated in FIG. 5, the outer shell 20 has an expanded surface 23 expanded relatively outward compared to the outer surface area of the impact resistance member 10, and the plurality of fastening holes 41 engaging with the fastening bolts 50 are radially formed on the expanded surface 23.

Referring to FIGS. 6 to 10, a protective cover 100 for a shoulder part of a pressure vessel according to a second embodiment of the present invention will be described.

As described above, a fixing part 131 is provided on any one of the outer circumferential surface of an impact resistance member 110 and the inner circumferential surface of an outer shell 120, and includes: an entrance groove 311 formed inward from the edge toward the center; and a seating groove 312 bent perpendicularly at one side end of the entrance groove 311 and extending in the circumferential direction.

The entrance groove 311 is formed to be recessed straight from the edge of the inner circumferential surface of the outer shell 120 toward the center to allow an insertion protrusion 321 of an insertion part 132, which will be described later, to go in and out.

Here, the width of the entrance groove 311 is made to correspond to the width of the insertion protrusion 321, and the depth of the entrance groove 311 corresponds to the protruded height of the insertion protrusion 321.

Additionally, the entrance grooves 311 are provided in plurality at positions spaced apart in the circumferential direction of the outer shell 120, and preferably, the plurality of entrance grooves 311 are formed radially based on the center point of the outer shell 120.

The seating groove 312 is bent perpendicularly at one side end of the entrance groove 311, is formed to extend in the circumferential direction of the inner circumferential surface of the outer shell 120, wherein the insertion protrusion 321 is seated after being inserted to fix the outer shell 120 and the impact resistance member 110.

After the seating groove 312 is bent perpendicularly from one side end of the entrance groove 311, the insertion protrusion 321 inserted through the entrance groove 311 moves to one side end of the entrance groove 311, and then, moves along the seating groove 312 and is seated on the seating groove to fix the impact resistance member 110 and the outer shell 120.

After the seating groove 312 is bent perpendicularly from the entrance groove 311 and the insertion protrusion 321 is inserted into the entrance groove 311, when any one of the outer shell 120 and the impact resistance member 110 is rotated in one direction, the insertion protrusion 321 moves to the seating groove 312 and is seated on the seating groove 312 to fix the impact resistance member 110 and the outer shell 120.

Meanwhile, the seating groove 312 further includes a retaining protrusion 313 to prevent the inserted insertion protrusion 321 from moving arbitrarily due to vibration or impact from the outside after being seated.

The retaining protrusion 313 protrudes outward from the surface of the seating groove 312, and the seating groove is formed at the center in the longitudinal direction, thereby preventing the insertion protrusion 321 from moving in the opposite direction, namely, toward the entrance groove 311 by vibration or impact transferred from the outside after the insertion protrusion 321 goes over the seating groove while moving.

In this case, the cross-section of the retaining protrusion 313 can be of various shapes such as a circle, a semicircle, a square, a trapezoid, etc., and is not limited to the semicircular shape illustrated in the drawings.

The insertion part 32 is configured to detachably couple with the fixing part 131, is provided on any one of the outer circumferential surface of the impact resistance member 110 or the inner circumferential surface of the outer shell 120, and includes an insertion protrusion 321 protruding outward from the surface.

Hereinafter, an embodiment where the insertion protrusion 321 is formed on the outer circumferential surface of the impact resistance member 110 will be described.

The insertion protrusion 321 protrudes outward from the outer circumferential surface of the impact resistance member 110 and is configured with a trapezoidal cross-section narrowing toward the protruding front end.

That is, the insertion protrusion 321 has a trapezoidal shape that the width of the protruding front end is narrow and the width of the surface side of the impact resistance member 10 is wide, and is moved and seated onto the seating groove 312 after being inserted into the entrance groove 311.

In this instance, the insertion protrusion 321, after passing over the retaining protrusion 313 protruding outward from the surface of the seating groove 312, is seated, and then, fixes the impact resistance member 110 and the outer shell 120. As described above, the insertion protrusion 321 is restricted in movement by the retaining protrusion 313, thereby preventing position displacement due to vibration or impact from the outside.

Meanwhile, the second embodiment is the same as the first embodiment in that after the impact resistance member 110 and the outer shell 120 are coupled together and are detachably coupled to the shoulder part to use, during the process of replacing the damaged or worn impact resistance member and outer shell, the fixing flange 40 is provided to maintain the sealability of the coupled portions of the liner, the shoulder part, and the nozzle of the pressure vessel.

Referring to FIGS. 11 to 15, a protective cover for a shoulder part of a pressure vessel according to a third embodiment of the present invention will be described.

For this purpose, in the present invention, a detachable means 230 includes: a holding part 231, which has a fixing groove 311 formed at a position spaced apart from the edge of the outer shell 220 toward the center, and a push bar 312 rotatably mounted on the outer shell 220 to elastically press the outer surface of the impact resistance member 210 or return the impact resistance member 210 to the original position; and a fitting part 232, which protrudes outward from the outer surface of the impact resistance member 210 and includes a coupling protrusion 321 seated on the fixing groove 311.

The holding parts 231 are formed in plurality at a plurality of positions spaced apart in the circumferential direction of the outer shell 220, and the fitting parts 321 detachably coupled to the holding parts 231 are formed in plurality at a plurality of positions spaced apart in the circumferential direction of the outer surface of the impact resistance member 210.

The holding part 231 includes the fixing groove 311 penetratingly formed at a position spaced apart from the edge of the outer shell 220 toward the center, and the push bar 312 rotatably mounted on the outer shell 220 to elastically press the outer surface of the impact resistance member 210 or return the impact resistance member 210 to the original position.

The fixing groove 311 is penetratingly formed at a position spaced apart from the edge of the outer shell 220 toward the center to allow the coupling protrusion 321 to go in and out.

The push bar 312 applies pressure to the outer surface of the impact resistance member 210 to detach the coupling protrusion 321 inserted into the fixing groove 311 from the fixing groove 311, and returns to its original position by elastic restoration force after applying pressure.

For this purpose, the push bar 312 is configured in a flat plate shape elongated in the longitudinal direction, and is rotatably provided on the outer shell 220 to elastically pressurize or return the outer surface of the impact resistance member 210.

The push bar 312 prevents positional displacement by touching an end portion of the coupling protrusion 321 inserted into the fixing groove 311 to couple the impact resistance member and the outer shell. To detach the impact resistance member, when pressure is applied to one side of the push bar 312 in the longitudinal direction, the other side in the longitudinal direction rotates upward so that the coupling protrusion 321 of the impact resistance member 210 is separated from the fixing groove 311.

Meanwhile, the push bar 312 is rotatably disposed on the outer shell 220, and for this purpose, a hinge or similar rotational means can be used to allow the push bar 312 to be rotatably installed on the outer shell 220. However, to reduce manufacturing costs and time, in the present invention, the push bar 312 is integrally formed with the outer shell 220, and a slit 313 cut with a predetermined width is formed between the push bar 312 and the outer shell 220.

Furthermore, the push bar 312 and the outer shell 220 are formed at the center in the longitudinal direction of the push bar 312, and a bridge 314 that connects the push bar 312 and the outer shell 220 is provided. Accordingly, when pressure is applied to one side of the push bar 312 in the longitudinal direction based on the bridge 314 as the rotational reference, the other side of the push bar 312 in the length direction rotates upward, and the raised push bar 312 returns to its original position.

While the coupling protrusion 321 is inserted into the fixing groove 311 by the push bar 312, the coupling protrusion 321 is inserted into the fixing groove 311 while pushing up the push bar 312. After completion of the insertion of the coupling protrusion 321 into the fixing groove 311, the push bar 312 fixes the position of the coupling protrusion 321 inserted into the fixing groove 311 while returning to its original position.

The fitting part 232 includes the coupling protrusion 321 detachably coupled to the fixing groove 311, wherein the coupling protrusion 321 has a block shape protruding outward from the outer surface of the impact resistance member 210.

Here, the coupling protrusion 321 protrudes to have a curvature gradually lowering toward the center of the impact resistance member 210, and a retaining surface 322 protruding perpendicularly outward is formed on one side end of the coupling protrusion which gets contact with one end of the push bar 312.

The coupling protrusion 321 is inserted into the fixing groove and seated in the fixing groove while pushing up the push bar 312 formed on the outer shell 220. Thereafter, the coupling protrusion 321 presses one side of the push bar 312 in the longitudinal direction to be separated from the fixing groove 311 through a space formed when the other side in the longitudinal direction is rotated upward, thereby detachably coupling the impact resistance member and the outer shell.

Meanwhile, the outer shell 220 further includes a loop surface 315 covering the upper portion of the fixing groove 311 to minimize the exposed area of the impact resistance member 210 coupled to the fixing groove 311.

The loop surface 315, as illustrated in FIG. 16, is configured to extend the outer shell 20 to cover the upper portion of the fixing groove 311 of the outer shell 20. In this instance, the inner surface of the loop surface 315 has a gentle curvature to match the curvature of the upper surface of the coupling protrusion 321 as directing the extended front end to touch and cover the upper surface of the coupling protrusion 321.

The loop surface 315 minimizes the exposed area of the impact resistance member exposed through the fixing groove 311, thereby minimizing foreign substances, especially moisture, from being introduced into the impact resistance member.

Meanwhile, the second embodiment is the same as the first embodiment in that after the impact resistance member 210 and the outer shell 220 are coupled together and are detachably coupled to the shoulder part to use, during the process of replacing the damaged or worn impact resistance member and outer shell, the fixing flange 40 is provided to maintain the sealability of the coupled portions of the liner, the shoulder part, and the nozzle of the pressure vessel.

What is claimed is:

1. A protective cover for a shoulder part of a pressure vessel, which is coupled to the shoulder part disposed on one or both sides of the pressure vessel to protect the shoulder part, the protective cover comprising:

an impact resistance member made of impact-absorbing foam;

an outer shell coupled to the impact resistance member and wrapping around the impact resistance member; and a detachable means for detachably coupling the impact resistance member and the outer shell to each other, wherein the detachable means comprises:

a holding part, which has a fixing groove formed at a position spaced apart from an edge of the outer shell toward the center of the outer shell, and a push bar rotatably mounted on the outer shell to elastically press an outer surface of the impact resistance member or return the impact resistance member to an original position thereof; and a fitting part, which protrudes outward from the outer surface of the impact resistance member and includes a coupling protrusion seated on the fixing groove.

2. The protective cover according to claim 1, further comprising a slit formed between the outer surface of the outer shell, wherein the push bar comprises a bridge connecting the push bar and the outer shell, and wherein the push bar is configured such that when one side of the push bar with respect to the bridge in a longitudinal direction of the push bar is pressed, the other side of the push bar with respect to the bridge in the longitudinal direction moves upward, and when pressure is released, the push bar is returned to an original position thereof.

3. The protective cover according to claim 1, wherein the coupling protrusion protrudes to have a curvature gradually lowering toward the center of the impact resistance member, and wherein a retaining surface protruding perpendicularly outward is formed on one side end of the coupling protrusion which gets contact with one end of the push bar.

4. The protective cover according to claim 1, wherein a loop surface is further included on the holding part to minimize an exposed area of the seated coupling protrusion by covering an upper portion of the fixing groove.

* * * * *